United States Patent [19]
Reiter et al.

[11] Patent Number: 6,086,098
[45] Date of Patent: Jul. 11, 2000

[54] ENERGY-ABSORBING DEFORMATION PROFILE FOR A MOTOR VEHICLE

[75] Inventors: Friedrich Reiter; Joerg Hensel, both of Sindelfingen; Alban Bossenmaier, Gaeufelden; Georg Bauer, Heilbronn; Juergen Bair, Sindelfingen, all of Germany

[73] Assignee: DaimlerChrysler AG, Stuttgart, Germany

[21] Appl. No.: 09/215,245

[22] Filed: Dec. 18, 1998

[30] Foreign Application Priority Data

Dec. 18, 1997 [DE] Germany ............................. 197 56 334

[51] Int. Cl.$^7$ ............................. B60R 21/045; F16F 7/12; B62D 25/14
[52] U.S. Cl. ............................. 280/752; 188/377; 296/70
[58] Field of Search ..................................... 280/751, 752, 280/748; 796/70; 188/371, 377

[56] References Cited

U.S. PATENT DOCUMENTS

| | | | |
|---|---|---|---|
| 3,831,705 | 8/1974 | Glance | 280/751 |
| 4,227,593 | 10/1980 | Bricmont et al. | 280/751 |
| 4,978,136 | 12/1990 | Tomita et al. | 280/751 |
| 5,273,314 | 12/1993 | Sakakibara | 280/752 |
| 5,370,417 | 12/1994 | Kelman et al. | 280/751 |
| 5,575,500 | 11/1996 | Mimura et al. | 280/751 |
| 5,609,385 | 3/1997 | Daniel et al. | 280/751 |
| 5,632,507 | 5/1997 | Sinner et al. | 280/751 |

FOREIGN PATENT DOCUMENTS 195 02 226
C1  5/1996  Germany .

OTHER PUBLICATIONS

Editor, What's New, Automotive Engineering, vol. 105 No. 1 (Jan. 19997), P. 139.
"Automotive Engineering" Jan. 1997 vol., P. 139.

Primary Examiner—Brian L. Johnson
Assistant Examiner—Michael Britton
Attorney, Agent, or Firm—Evenson, McKeown, Edwards & Lenahan, P.L.L.C.

[57] ABSTRACT

An energy-absorbing deformation profile for a motor vehicle such as a knee protection device for an underside of a center console area has a rigid linkage profile section for fastening the deformation profile on a center console cross member. The linkage profile section is designed so that it can be deformed while absorbing energy.

6 Claims, 2 Drawing Sheets

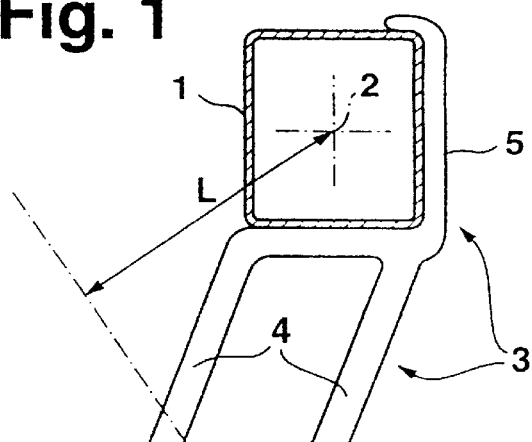
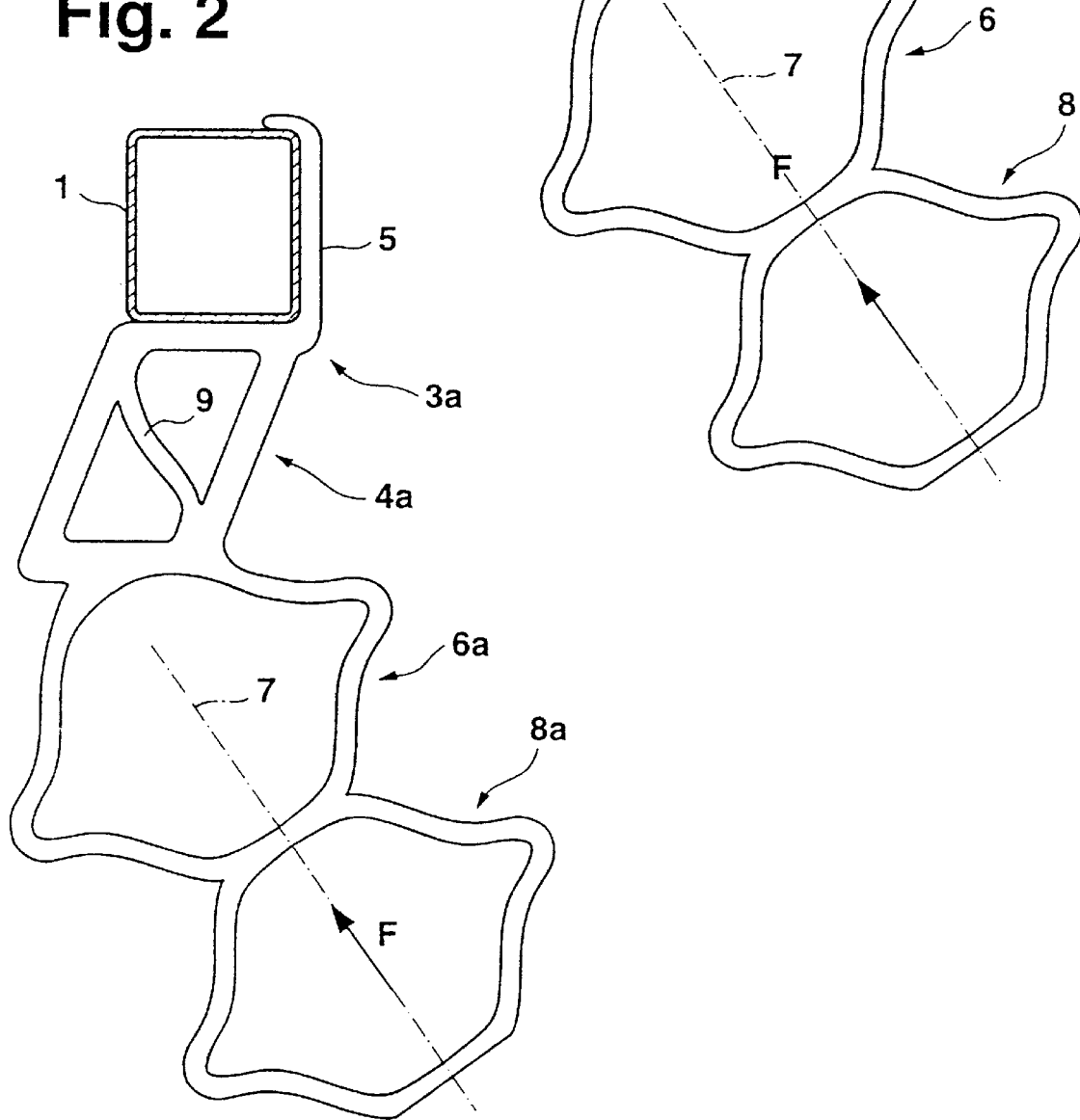

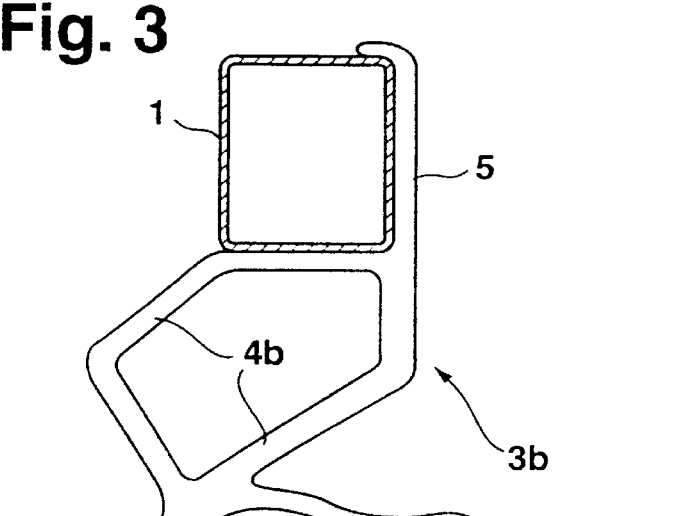
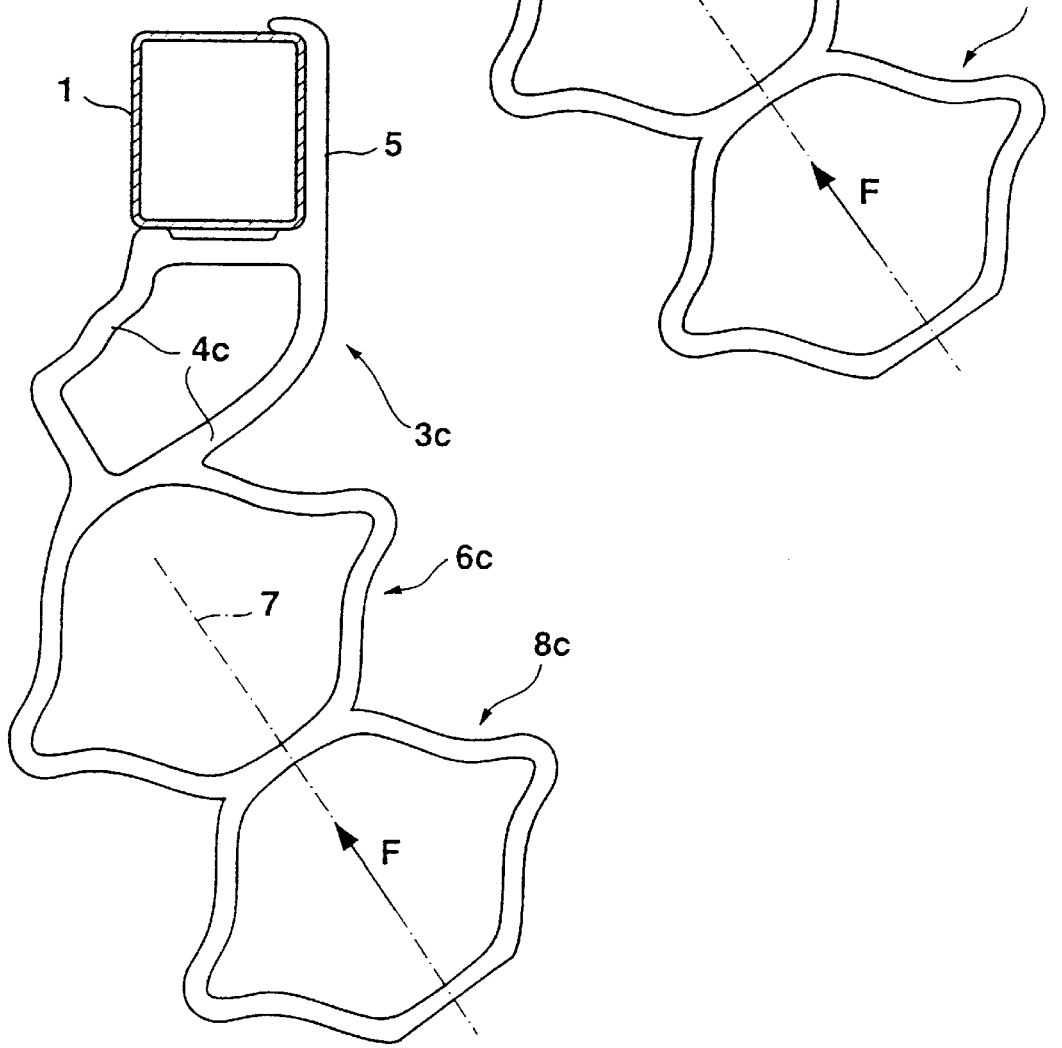

ENERGY-ABSORBING DEFORMATION PROFILE FOR A MOTOR VEHICLE

BACKGROUND AND SUMMARY OF THE INVENTION

The invention relates to an energy-absorbing deformation profile for a motor vehicle, particularly in the case of a knee protection device for the underside of a center console area.

The device has at least two hollow profile sections with a honeycomb-type design which adjoin one another along a common deformation axis and has a linkage profile section for fastening the deformation profile on a member part of a vehicle body support structure, particularly on a center console cross member.

An energy-absorbing deformation profile of this generic type, known for example, from the journal *Automotive Engineering*, January 1997 Volume, Page 139, is used in a knee protection device for an underside of a center console area of a passenger car. The energy-absorbing deformation profile is made of aluminum and has three hollow profile sections which carry out the energy-absorbing deformation, and which each have a honeycomb-type design. The hollow profile sections are arranged behind one another in the deformation direction. In addition, the deformation profile has a linkage profile section which has a high stiffness and is used to fasten the deformation profile on a center console cross member of the vehicle body support structure. Because of the stiff linkage profile section, further energy absorption by the knee protection device is no longer possible when the three honeycomb-type hollow profile sections have been pressed together to form a block.

It is an object of the present invention to provide an energy-absorbing deformation profile of the initially mentioned type, which has an increased energy-absorbing capability in comparison to the prior art.

This and other objects and advantages are achieved by the energy absorbing deformation profile according to the invention, in which the linkage profile section has an energy-absorbingly deformable design. As the result of the additional energy absorbing effect of the linkage profile section, a supplementary deformation path is provided which increases the energy absorption capacity of the whole deformation profile. This additional deformation path does not exist in the prior art, in which the linkage profile section has a stiff and inflexible design. In addition, the enlarged deformation path prevents a sudden rise of force after the utilization of the whole deformation path of the hollow profile section because of the occurring block formation.

As a further development of the invention, the hollow profile sections are arranged to be offset relative to the linkage profile section, such that the deformation axis extends at a distance from the member part of the vehicle body support structure. As the result of this further feature, the direction of the effect of the energy-absorbing deformation of the hollow profile sections is applied at a distance from the member part, so that a corresponding moment is introduced into the member part. An additional deformation path laterally adjacent to the member part can therefore be utilized, since the deformation direction extends past the member part.

In a further embodiment of the invention, the energy-absorbing deformation of the linkage profile section is designed such that a force level necessary for deformation of the linkage profile section is higher than a force level required for deformation of the honeycomb-type hollow profile sections. This ensures that, in the event of a deformation, the honeycomb-type hollow profile sections are deformed first, followed by the linkage profile section. Thus, in the event of a corresponding impact stress on the motor vehicle, the deformation path of the honeycomb-type hollow profile sections will be utilized first.

As a further feature of the invention, the linkage profile section is provided with a parallelogram-type effective cross-section. This ensures that, also after a completed compression for the block formation, the hollow profile sections do not swivel about the member part, but carry out a further movement in the direction of the deformation force. As the result, a largely rectangular characteristic force-path curve can be achieved in the event of dynamic stress.

As a further feature of the invention, the linkage profile section has an angular contact area which partially encloses a square cross member. As a result, a secure fastening of the linkage profile section (and thus of the deformation profile on the cross member) is achieved, without any reduction of the available deformation path.

Other objects, advantages and novel features of the present invention will become apparent from the following detailed description of the invention when considered in conjunction with the accompanying drawings.

BRIEF DESCRIPTION OF THE DRAWINGS

FIG. 1 is a cross-sectional view of a first embodiment of a deformation profile according to the invention, arranged on a member part of a vehicle body support structure;

FIG. 2 is a cross-sectional view of another deformation profile similar to FIG. 1;

FIG. 3 is a view of another embodiment of a deformation profile according to the invention similar to FIG. 1; and FIG. 4 is a view of another embodiment of a deformation profile according to the invention similar to FIG. 3.

DETAILED DESCRIPTION OF THE DRAWINGS

A deformation profile according to the invention is illustrated in various embodiments in FIGS. 1 to 4, integrated in a knee protection device for an underside of a center console area in a vehicle interior of a passenger car. In a known manner, such a center console area has a center console cross member which, as a member part (and thus as a supporting component), extends transversely to the longitudinal vehicle direction along the width of the center console area. It is connected in a force-transmitting manner with lateral support columns of a vehicle support structure. Since the basic arrangement of a center console cross member within a center console area as well as relative to a vehicle body support structure of a passenger car is known, the drawing does not show any details in this respect.

In the embodiments according to FIGS. 1 to 4, the center console cross member 1 has a square profile and has a longitudinal center axis 2. According to FIG. 1, an energy-absorbing deformation profile which is fastened on the center console cross member 1, is designed in one piece as an extruded light-metal profile, preferably made of aluminum. By means of the free ends of respective deformation profiles, which are preferably arranged in the area of the knee impact points, a plate-shaped knee protection device is held which is constructed as a load distributor and which may extend along the width of the driver space and/or the front passenger space of the center console area. The deformation profile projects downward from the center console cross member 1 and approximately in the longitudinal direction of the vehicle into a foot space diagonally toward the rear. The sectional representation according to FIGS. 1 to 4 therefore represents a cross section which extends in a vertical longitudinal vehicle plane through the center console cross member and the deformation profile.

The deformation profile has two hollow profile sections 6, designed in a honeycomb shape which are arranged behind one another along a deformation axis 7 and thus in the direction of the effect F of a deformation force. Since the whole deformation profile is constructed in one piece, the hollow profile sections 6 and 8 also change into one another in a single piece. The direction of the effect F of a deformation force is defined by the impacting of the knee protection device onto the knee regions of a front passenger in the event of a frontal impact of the vehicle, so that the direction of the effect F defines the relative movement of the knee regions with respect to the deformation profile.

The hollow profile section 6, which is in front in the direction of the effect F, is adjoined by a linkage profile section 3 which also extends in one piece from the hollow profile section 6. The linkage profile section 3 does not extend, like the hollow profile sections 6 and 8, symmetrically with respect to the deformation axis 7; rather, it is arranged eccentrically thereto in that it extends laterally away from the deformation axis 7. The linkage profile section 3 has an angular contact area 5 which encloses the center console cross member 1 along a portion of its circumference in a flush manner. The contact area 5 is fixed to the center console cross member 1 by means of fastening devices (not shown), particularly by means of mechanical fastening elements or by means of glue, solder or welded connections. The contact area is connected with the hollow profile section 6 by way of a deformation area 4 of the linkage profile section 3 which, as a hollow profile, is provided with a parallelogram-type cross-section.

In addition to the hollow profile sections 6 and 8, this deformation area of the linkage profile section can be deformed in an energy-absorbing manner. For this purpose, the parallelogram-shaped supporting frame formed by the deformation area 4 has a more stable design than the honeycomb-shaped hollow profile sections 6 and 8. This ensures that, in the event of a corresponding impact stress, the hollow profile sections 6 and 8 are deformed first, before deformation of the deformation area 4. The arrangement of the walls of the deformation area 4 is such that, in the event of a deformation of the deformation area 4, the direction of the deformation force F is maintained longitudinally to the deformation axis 7. Thus, the whole deformation profile is moved at least partially past the center console cross member 1 in order to absorb a corresponding impact stress with a deformation effect. As illustrated by means of FIG. 1, the deformation axis 7 is situated at a distance L from the longitudinal center axis of the center console cross member 1; thus, in the case of a corresponding deformation stress on the deformation profile, a torsional moment is exerted on the center console cross member 1.

The deformation profile 3a, 4a, 6a, 8a according to FIG. 2 corresponds essentially to the deformation profile 3, 4, 6, 8 according to FIG. 1, so that only the different design of this deformation profile will be discussed in the following. The only difference with respect to the deformation profile according to FIG. 1 consists of the fact that the deformation area 4a of the linkage profile 3a is additionally provided with a cross-web 9 curved in an S-shape which penetrates the hollow space of the deformation area 4a approximately in parallel to the deformation axis 7. The S-shaped curvature of the cross-web 9 ensures a targeted deformability, in which the force level for the deformation of the linkage profile section 4a is increased because of this additional cross-web 9 in comparison to the force level of the linkage profile section 3 according to FIG. 1.

As the result of this cross-web 9, an additional energy reduction therefore takes place within the linkage profile section 3a in comparison to the deformation profile according to FIG. 1 at a correspondingly higher force level. Otherwise, the deformation profile corresponds to the described deformation profile according to FIG. 1 so that, with respect to detailed explanations, reference is made to the description of FIG. 1.

In the case of the embodiments according to FIGS. 3 and 4, the hollow profile sections 6b, 8b and 6c, 8c correspond to the above-described hollow-profile sections 6, 8 and 6a, 8a according to FIG. 1 and 2. The linkage area 5 also corresponds to the respective above-described linkage areas 5. In contrast to the embodiments of FIGS. 1 and 2, in the embodiments of FIGS. 3 and 4, only the linkage profile sections 3b and 3c have different designs. In the embodiment according to FIG. 3, the deformation area 4b of the linkage profile section 3b has a polygonal cross-section, in which a first profile leg adjoining the hollow profile section 6b extends along the deformation axis 7 and a second profile leg of the deformation area 4b extends at a right angle with respect to the deformation axis 7 toward the side. The deformation area 4b is also laterally offset with respect to the deformation axis 7 so that the longitudinal center axis of the center console cross member 1, which is not shown in detail, has the same distance L (not shown) from the deformation axis 7 as in the embodiment according to FIG. 1.

In the embodiment according to FIG. 4, the linkage profile section 3c is provided with a deformation area 4c which is also designed as a hollow profile. However, the deformation area 4c has curved walls, and therefore curved profile legs which, in the event of a corresponding impact stress, cause a rotation of the hollow profile sections 6c and 8c after being compressed to form a block, about the center console cross member 1. In this embodiment, no continuation therefore takes place of the direction of the effect of the deformation path along the deformation axis 7 after the complete compression of the hollow profile section 6c and 8c but a circular swivel motion along a defined angle past the center console cross member 1.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Energy-absorbing deformation profile apparatus for a motor vehicle, comprising:

a plurality of adjoining hollow profile sections which have a honeycomb design and are aligned along a common deformation axis;

a hollow linkage profile section connected at an end of said adjoining profile sections, for fastening the deformation profile apparatus on a member part of a vehicle body support structure;

wherein, in an undeformed state of said deformation profile apparatus, the linkage profile section is aligned on an axis which is substantially divergent to the deformation axis; and wherein the linkage profile is deformable in an energy-absorbing manner.

2. Apparatus according to claim 1 wherein said energy-absorbing profile is mounted as a knee protection device for an underside of a center console area, and said member part of said vehicle body support structure is a center console cross member.

3. Apparatus according to claim 1, wherein the hollow profile sections are offset relative to the linkage profile section such that the deformation axis passes at a distance from the member part of the vehicle body support structure.

4. Apparatus according to claim 1 wherein the energy-absorbing property of the linkage profile section is selected such that a force level necessary for deformation of the linkage profile section is higher than a force level necessary for the deformation of the honeycomb-type hollow profile sections.

5. Deformation profile according to claim 1 wherein the linkage profile section has an effective cross-section which is substantially in the shape of a parallelogram.

6. Deformation profile according to claim 1 wherein the linkage profile section has an angular contact area which partially encloses a square cross-member.

* * * * *